US009302451B2

(12) United States Patent
Lisinski et al.

(10) Patent No.: US 9,302,451 B2
(45) Date of Patent: Apr. 5, 2016

(54) TRANSPARENT PANEL HAVING HEATABLE COATING AND PRODUCTION METHOD THEREFOR

(75) Inventors: Susanne Lisinski, Cologne (DE); Guenther Schall, Kreuzau (DE); Dang Cuong Phan, Aachen (DE); Bernhard Reul, Herzogenrath (DE); Gunther Vortmeier, Aichtal (DE)

(73) Assignee: Saint-Gobain Glass France, Courbevoie (FR)

( * ) Notice: Subject to any disclaimer, the term of this patent is extended or adjusted under 35 U.S.C. 154(b) by 630 days.

(21) Appl. No.: 13/695,929

(22) PCT Filed: May 10, 2011

(86) PCT No.: PCT/EP2011/057565
§ 371 (c)(1),
(2), (4) Date: Mar. 14, 2013

(87) PCT Pub. No.: WO2011/141487
PCT Pub. Date: Nov. 17, 2011

(65) Prior Publication Data
US 2013/0161309 A1    Jun. 27, 2013

(30) Foreign Application Priority Data
May 10, 2010    (EP) .................................. 10162471

(51) Int. Cl.
*H05B 3/84*    (2006.01)
*H05B 3/86*    (2006.01)
(Continued)

(52) U.S. Cl.
CPC ..... *B32B 17/10174* (2013.01); *B32B 17/10036* (2013.01); *B32B 17/10376* (2013.01); *B60J1/002* (2013.01); *B60S 1/048* (2013.01); *H05B 3/86* (2013.01); *H05B 2203/002* (2013.01); *H05B 2203/008* (2013.01); *H05B 2203/031* (2013.01)

(58) Field of Classification Search
CPC ............. H05B 3/84; H05B 3/845; H05B 3/86
USPC .......................... 219/202, 203, 522, 541, 544
See application file for complete search history.

(56) References Cited

U.S. PATENT DOCUMENTS 5,434,384 A     7/1995   Koontz
6,492,619 B1 *  12/2002  Sol .................................. 219/203
(Continued)

FOREIGN PATENT DOCUMENTS

DE         101 60 806      6/2003
DE       10 2007 008 833   8/2008
EP          0 524 537      1/1993

OTHER PUBLICATIONS

International Search Report issued Sep. 2, 2011 in PCT/EP11/057565 Filed May 10, 2011.
(Continued)

*Primary Examiner* — Brian Jennison
(74) *Attorney, Agent, or Firm* — Oblon, McClelland, Maier & Neustadt, L.L.P.

(57) ABSTRACT

The invention relates to a transparent pane with a transparent heatable coating, which extends at least over a part of the pane surface, in particular over its visual field. The heatable coating is divided by at least one heatable coating-free zone into at least one first heatable coating zone and a second heatable coating zone, wherein the two heatable coating zones are in each case electrically connected to at least two collecting conductors such that after application of a supply voltage that is provided by a voltage source, in each case a current flows over at least one first heating field formed by the first heatable coating zone and at least one second heating field formed by the second heatable coating zone. At least one heating element is disposed in the heatable coating-free zone, which heating element has an ohmic resistance such that by means of application of the supply voltage to the heating element, the pane is heatable in a surface area containing the heatable coating-free zone. The at least one heating element is configured such that by means of application of the supply voltage to the heating element, the pane is also heatable in at least one surface area adjacent the coating-free zone which surface area contains at least one of the collecting conductors.

15 Claims, 5 Drawing Sheets

(51) Int. Cl.
*B32B 17/10* (2006.01)
*B60J 1/00* (2006.01)
*B60S 1/04* (2006.01)

(56) References Cited

U.S. PATENT DOCUMENTS

2004/0084432 A1 5/2004 Schwartz et al.
2005/0045613 A1 3/2005 Maeuser et al.
2009/0321407 A1* 12/2009 Dixon et al. .................. 219/203
2010/0270280 A1 10/2010 Blanchard et al.

OTHER PUBLICATIONS

International Preliminary Report on Patentability Issued Nov. 13, 2012 in PCT/EP2011/057565 Filed May 10, 2011.
Written Opinion of the International Searching Authority Issued Nov. 22, 2012 in PCT/EP2011/057565 (with English translation).

* cited by examiner

TRANSPARENT PANEL HAVING HEATABLE COATING AND PRODUCTION METHOD THEREFOR

The invention relates generally to a transparent pane with an electrically heatable coating, and a method for its production.

Panes with a transparent, electrically heatable coating are well-known per se and have already been described many times in the patent literature. Merely by way of example, reference is made in this regard to the German published patent applications DE 10200705286, DE 102008018147 A1, and DE 102008029986 A1.

In motor vehicles, they are frequently used as windshields since the central visual field ("visual field A") of windshields, in contrast to rear windows, must, by law, have no vision restrictions whatsoever. By means of the heat generated by the heatable coating, condensed moisture, ice, and snow can be removed in a short time even in the central visual field.

Transparent panes with an electrically heatable coating are usually configured as composite panes, in which two individual panes are bonded to each other, for example, by a thermoplastic adhesive layer. The heatable coating is, for example, disposed on the surface of one of the two individual panes adjoining the thermoplastic adhesive layer. However, different structures are also known wherein the heatable coating is applied, for example, on a carrier film which is then, in turn, adhered to the two individual panes. The heatable coating, made, for example, of metal or metal oxide, can be configured as an individual layer or assembled from a sequence of layers that includes at least one such individual layer.

The heating current is usually introduced into the heatable coating by at least one pair of strip- or band-shaped electrodes ("bus bars"). These should, as collecting conductors, introduce the heating current into the coating as uniformly as possible and distribute it widely. Since the band-shaped collecting conductors are nontransparent they are typically covered by opaque masking strips. These are commonly made of a nonconductive, black pigmented, bakeable material that is applied to the pane, for example, as a screenprinting paste using a screenprinting method.

The electrical sheet resistance of the heatable coating is relatively high in the case of materials currently used in series production and can be on the order of several ohms per square. In order to nevertheless obtain adequate heating output, the heating voltage had to be correspondingly high, whereas, for example, in motor vehicles an onboard voltage of only 12 to 24 volts is standardly available.

In principle, the layer thickness of the heatable coating can be increased in order to lower the sheet resistance, but this is always accompanied by a reduction of the optical transmission of the pane and thus is, also by law, possible only to a limited extent. Since the sheet resistance increases with the length of the current paths, the collecting conductors of opposite polarity should have the least possible distance between them in order to effect the greatest possible heating output.

In the case of motor vehicle windowpanes, which are usually wider than they are high, the collecting conductors are, consequently, typically disposed along the longer sides of the pane (top and bottom, in the assembled position) such that the heating current can flow via the shorter path of the height of the window pane. In addition, they are disposed as close as possible to the edges of the masking strips facing each other. However, this design results in the fact that in the region of a resting or parked position of windshield wipers provided to wipe the pane, inadequate heating output is, for the most part, present such that the wipers can freeze.

A solution to this problem is proposed in European patent EP 1454509 B1. In the transparent pane disclosed there, a heatable visual field is enclosed by two current collecting tracks, with the visual field divided by one of the two current collecting tracks and, in particular, by a stripped region of an additional heated region. In the additional heated region, additional current collecting tracks of opposite polarity are provided in order to heat the pane in the masked region below the visual field.

In contrast, the object of the present invention consists in further developing transparent panes with electrically heatable coating advantageously, wherein, in particular, the heating output in the region of a resting or parked position of wipers is further improved. This and further objects are accomplished according to the proposal of the invention by means of a transparent pane with heatable coating with the characteristics of the independent claim. Advantageous embodiments of the invention are given by the characteristics of the dependent claims.

The transparent pane comprises an electrically heatable, transparent coating that extends at least over a substantial part of the pane surface, in particular over its central visual field. The heatable coating is divided by at least one coating-free zone into at least two coating zones separated from each other, namely a first coating zone and a second coating zone. The two coating zones are galvanically separated from each other by the coating-free zone.

In addition, the coating zones are in each case electrically connected to at least two collecting conductors such that after application of a supply voltage that is provided by a voltage source, in each case an electrical current flows over at least one first heating field formed by the first coating zone and at least one second heating field formed by the second coating zone. The supply voltages applied on the two coating zones can be the same or different from each other, preferably being the same and provided by one and the same voltage source.

The collecting conductors can, for example, be implemented as strip- or band-shaped electrodes and have, compared to the relatively high-ohmic electrically heatable coating, a relatively low-ohmic electrical resistance. Usually, the collecting conductors have a negligible ohmic resistance, compared to the heatable coating, such that they do not appreciably heat up when impinged on by the supply voltage and thus make virtually no contribution to the heating of the pane.

According to the proposal of the invention, at least one heating element is disposed in the coating-free zone, which heating element has an ohmic resistance such that by means of application of the supply voltage to the heating element, the pane is heatable in a surface area containing the coating-free zone. The supply voltage applied to the heating element can be the same as or different from the supply voltage of the coating zone, preferably with the same supply voltage applied to the heating element and the two coating zones and provided by one and the same voltage source. Additionally, the at least one heating element is configured such that by means of application of the supply voltage to the heating element, the pane is also heatable, (substantially) by thermal conduction and (to a very small extent) by thermal radiation, in at least one surface area adjacent the coating-free zone, which surface area contains at least one of the collecting conductors. This can, in particular, be achieved in that the specific heating output (heating output per area, expressed, for example, in watt/dm$^2$) of the at least one heating element is greater than the specific heating output of the heating field to whose coating zone the collecting conductor contained in the surface area is electrically connected.

By means of this measure, it can be advantageously achieved that not only the coating-free zone is heated, but also a surface area of the pane with a collecting conductor adjacent the coating-free zone, in which surface area no appreciable heating output from the heatable coating is present, is heated. For example, the specific heating output of the at least one heating element is, for this purpose, greater by at least 20%, in particular at least 30%, than the specific heating output of this heating field, but, on the other hand, the difference in the specific heating output must not be so great that undesirably great thermal stresses develop in the pane. In this regard, it can, in particular, be advantageous for the specific heating output in the coating-free zone to be a maximum of 8 watts/$dm^2$.

Advantageously, the at least one heating element is configured such that in the adjacent surface area of the pane that has the collecting conductor, a specific heating output is achieved by heating the heating element that corresponds to at least the specific heating output of the heating field to which the collecting conductor is electrically connected.

Moreover, with respect to good heat transfer from the coating-free zone to the adjacent surface area containing collecting conductors, it can be advantageous for the distance between the at least one heating element and the collecting conductor contained in the adjacent surface area to be as small as possible and to be, for example, in the range of a few millimeters and, in particular, a maximum of 1 millimeter.

In a special embodiment of the pane according to the invention as a motor vehicle windshield, it comprises two coating zones that are galvanically separated from each other by a coating-free zone, with a first coating zone situated in the region of the central visual field of the pane and a second coating zone situated in the region of a resting or parked position of windshield wipers. Both the first coating zone and the second coating zone are in each case electrically connected (directly) to at least two collecting conductors, by which means a first heating field is formed in the region of the central visual field of the pane and a second heating field is formed in the region of the resting or parked position of the windshield wipers. For example, the collecting conductors can be configured in the form of bands or strips; in particular, the first heating field in the central visual field of the pane can be delimited by two band-shaped collecting conductors with space between them. In the installed state, the motor vehicle windshield thus typically has a first (upper) heating field in the visual field of the pane with an upper and lower collecting conductor by which the first heating field is delimited, and a second (lower) heating field in the region of the resting or parked position of the windshield wipers that are galvanically separated from each other by a coating-free zone. The coating-free zone can be heated by the at least one heating element contained in the coating-free zone. A surface area of the pane that adjoins the coating-free zone and contains the lower collecting conductor of the first heating field is heated by the heating element substantially on the basis of thermal conduction. Typically, the lower collecting conductor adjoins the coating-free zone.

The pane according to the invention thus has a division of the heatable coating into at least two heating fields separated from each other by a coating-free zone, whereby a surface area of the pane containing the coating-free zone can be heated, and whereby an adjoining surface area of the pane, which, in fact, has a heatable coating, but is not part of the heating field, is heatable by heating element, in order, in particular, to reliably prevent icing of a vehicle windshield in this surface area.

In industrial series production, removal of the heatable coating takes place, for example, mechanically, by means of a grinding wheel, with, in principle, ablation through the use of a laser beam also conceivable. Usually, mechanical stripping is accompanied by structural weakening or thinning of the pane. Moreover, the heat absorbing properties (IR-absorption) of coated and stripped surface areas are different such that it can occur that the geometry of the pane changes undesirably in the stripped surface areas at the time of bending of the pane and, for example, a bulging convexity appears. For these reasons, it is generally desirable for the coating-free zone situated between the two adjoining heating fields to occupy a relatively small area, for example, expressed as a relatively small width (dimension perpendicular to its length) of a band-shaped coating-free zone. Nevertheless, these efforts are subjected to limits due to practical considerations since stripping requires a certain width of the grinding wheel with relatively low cycle times and the grinding wheels are, moreover, usually used in various regions of the pane, for example, for the stripping of communication windows. For this reason, the stripped zones are, in practice, made with a certain width that makes icing of the pane likely there without appropriate countermeasures. All the more so since it can be advantageous with motor vehicle windshields designed in this manner for the lower collecting conductor to adjoin the stripped zone such that the conventionally unheated region is actually enlarged by the surface area having the lower collecting conductor adjoining the stripped zone. According to the invention, in both the coating-free zone and the adjacent surface area containing the lower collecting conductor, icing can be reliably and safely prevented by heating the at least one heating element.

Whereas the collecting conductors, as already mentioned above, due to their low ohmic resistance give off only very little heat and make no appreciable contribution to the heating output, the at least one heating element has a substantially higher resistance than the collecting conductors and is thus capable of heating the surface area of the pane containing the coating-free zone, with at least one surface area of the pane with at least one collecting conductor adjoining the coating-free zone also being heated substantially by thermal conduction.

Preferably, the heating element extends over a substantial part of the coating-free zone in order to thus effect the most uniform and complete heating of the coating-free zone and of the surface area of the pane having a collecting conductor possible.

In the pane according to the invention, each coating zone is electrically connected to at least two collecting conductors, wherein a heating field is formed between the two collecting conductors of one and the same coating zone and the collecting conductors in particular delimit the heating fields. The collecting conductors of the at least two coating zones provided for connection with one and the same pole of a voltage source can be electrically separated or electrically connected to each other. In the second case, the collecting conductors of the at least two coating zones provided for connection with one and the same voltage source are configured as sections of a single collecting conductor.

In principle, the coating zones and the at least one heating element can have external connectors separated from each other and can be electrically supplied independent of each other. However, according to the invention, a common supplying of the coating zones and of the heating element with the same supply voltage, which can be made available from one and the same voltage source, is preferred. For this purpose, it is advantageous for the heating element to be electrically connected to at least two collecting conductors of the coating zones, which are provided for an electrical connection with various poles of the voltage source. This measure enables a particularly simple technical realization of the pane since the heating element does not have to be connected to separate external connectors and at the time of heating at least one heating field is always impinged upon by the supply voltage and is thus heated. In this regard, it is further advantageous for the collecting conductors of the two coating zones, which are in each case provided for a connection with one and the same pole of the voltage source, to be electrically connected such that not only the heating element can be heated together with at least one heating field, but also the at least two heating fields can be heated together.

In another advantageous embodiment of the transparent pane according to the invention, a first collecting conductor provided for connection to the one pole comprises a first collecting conductor section connected to the first coating zone and at least one second collecting conductor section connected to the second coating zone. Here, for example, the second collecting conductor section extends starting from the first collecting conductor section at least at an angle, in particular perpendicular, to the first collecting conductor section, with the second collecting conductor section and the first collecting conductor section forming, for example, an angle in the range from 45° to 135°. On the other hand, a second collecting conductor provided for connection to the other pole comprises a third collecting conductor section connected to the first coating zone and at least one fourth collecting conductor section connected to the second coating zone, which extends, for example, to the first collecting conductor section without being electrically connected thereto. This measure enables a particularly simple technical realization of the electrical connection of the collecting conductors of the two coating zones.

It can also be advantageous for the coating-free zone to be divided by the second collecting conductor section into two at least approx. same sized zone parts, with the second collecting conductor section disposed between two fourth collecting conductor sections. In addition, it can be advantageous for at least one heating element to be disposed in each zone part, in order to accomplish the most effective heating of the surface area of the pane containing the coating-free zone possible.

In another advantageous embodiment of the transparent pane according to the invention, the heating element is configured such that by means of application of the supply voltage, the surface area of the pane which contains the first collecting conductor section is also heatable. By means of this measure, even the relatively cold surface area of the first collecting conductor section can be heated such that the heating output of the pane is improved overall.

In another advantageous embodiment of the transparent pane according to the invention, the heating element is made from one and the same material as the collecting conductor, with the possibility, in particular, of it being produced from a metallic printing paste, in particular, screenprinting paste.

In an other advantageous embodiment of the transparent pane according to the invention, it is configured as a composite pane. The composite pane comprises a rigid or flexible inner and outer pane that are bonded to each other by at least one thermoplastic adhesive layer. Obviously, the two individual panes do not absolutely have to be made of glass; instead they can also be made of a non-glass material, e.g., plastic.

Advantageously, the transparent pane according to the invention is implemented as a vehicle windshield, wherein the heating element is situated in the region of a resting or parked position of windshield wipers provided to wipe the pane. Through the capability of heating the pane in the region of the coating-free zone and of also heating an adjacent surface area with a collecting conductor, freezing of the wipers in the resting or parked position can be particularly effectively prevented in an advantageous manner.

The invention further extends to a method for producing a transparent pane with an electrically heatable, transparent coating, comprising the following steps:

producing a pane provided with a heatable coating, for example, by application of the coating to a blank from which the pane is then formed, or by application of the coating to a preformed pane;

forming at least one coating-free zone, by which the heatable coating is (galvanically) divided into at least one first coating zone and one second coating zone;

producing at least two collecting conductors, which are electrically connected to the two coating zones such that after application of a supply voltage, in each case an electric current flows over at least one first heating field formed by the first coating zone and at least one second heating field formed by the second coating zone;

producing at least one heating element in the coating-free zone, by means of which a surface area of the pane containing the coating-free zone is heatable, and wherein the at least one heating element is configured such that by means of application of the supply voltage to the heating element, the pane is also heatable in at least one surface area adjacent the coating-free zone which surface area contains at least one of the collecting conductors.

The coating-free zone can be produced, for example, by masking before application of the heatable coating. Alternatively, the coating-free zone can be produced by mechanical ablation after application of the heatable coating.

It can be advantageous for the heating element to be made from the same material as the collecting conductors and formed together therewith. The heating element and the collecting conductors can, for example, be produced by printing, in particular by screenprinting. Merely for the sake of completeness, it is mentioned that, alternatively, it would also be possible to produce the heating element from a metal wire and/or metal foil.

BRIEF DESCRIPTION OF THE DRAWINGS

The invention is now explained in detail using exemplary embodiments and referring to the accompanying drawings. They depict, in simplified representation that is not true to scale.

DETAILED DESCRIPTION OF THE DRAWINGS

Figure 1:
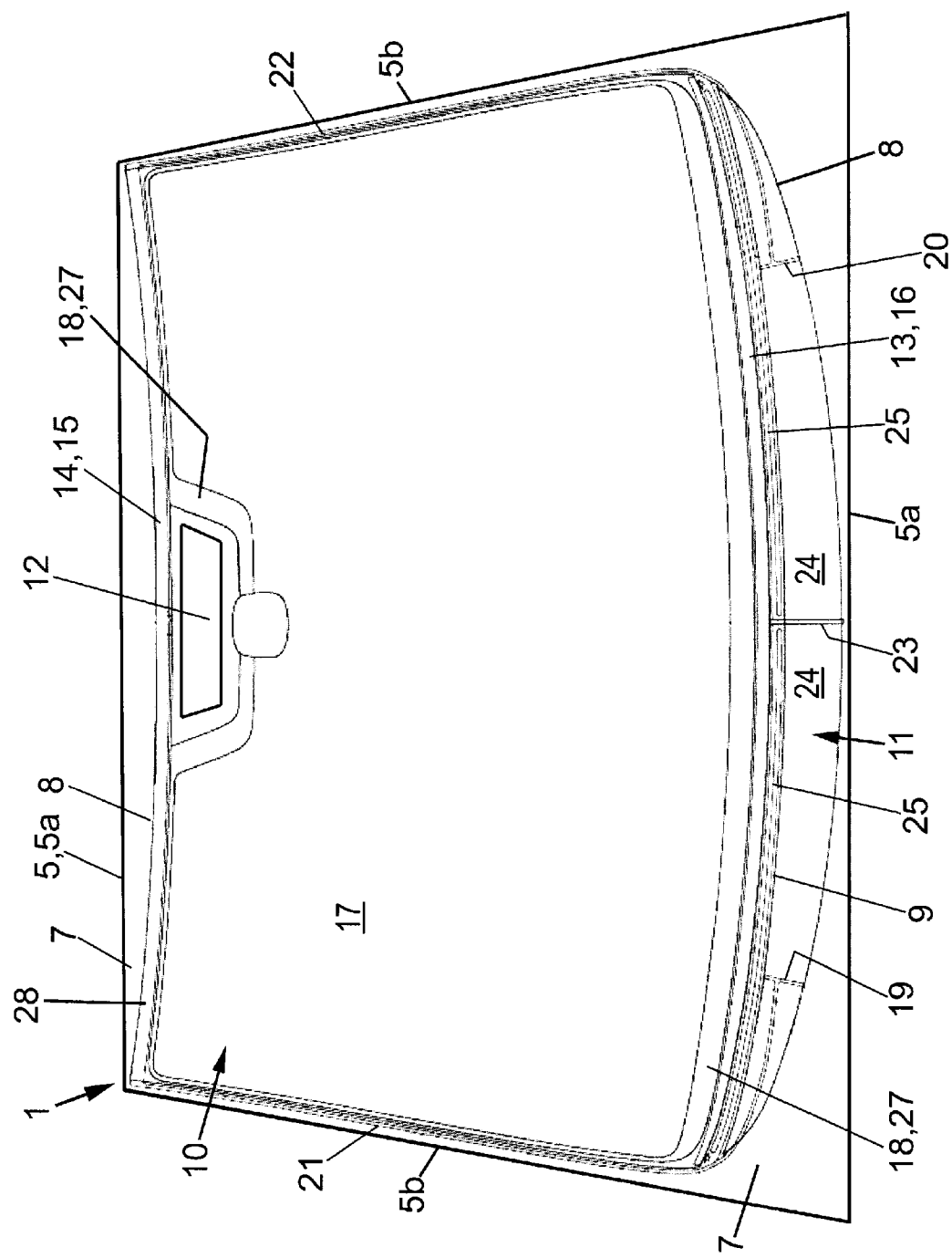
FIG. 1 schematically, an exemplary embodiment of the pane according to the invention in its embodiment as a windshield of a motor vehicle.
Figure 1A:
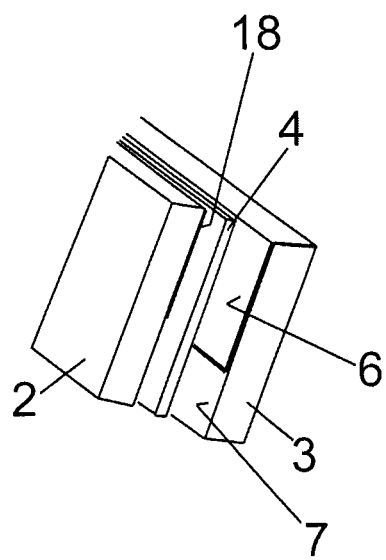
FIG. 1A schematically, the structure of the windshield of FIG. 1.
Figure 2:
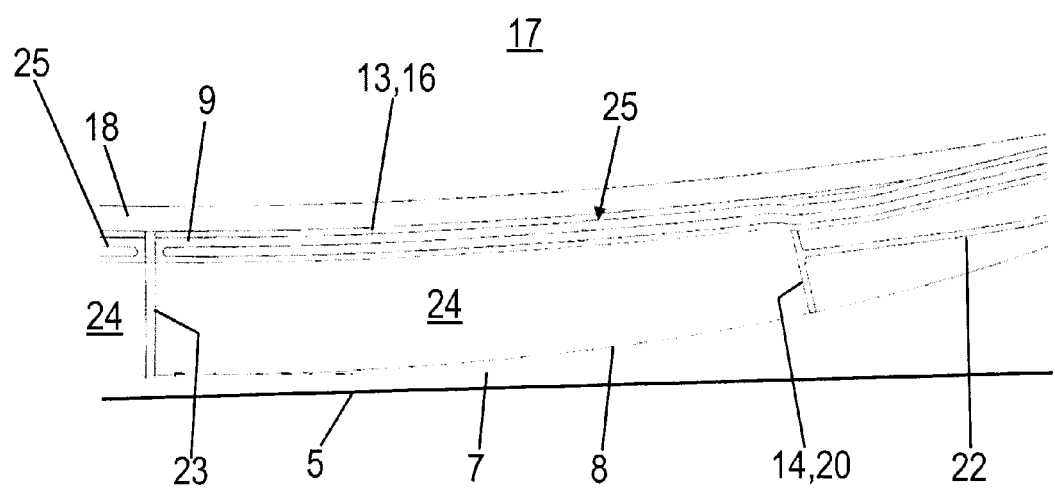
FIG. 2 an enlarged detail of the windshield of FIG. 1.

FIGS. 1, 1A, and 2 illustrate, as an exemplary embodiment of the invention, a motor vehicle windshield designated as a whole with the reference number 1, depiction of which corresponds to a typical installation position in the motor vehicle. The windshield 1 is implemented as a composite pane, whose structure is depicted in detail in FIG. 1A. According to it, the windshield 1 comprises a rigid outer pane 2 disposed on the outside and a rigid inner pane 3 disposed on the inside, both of which are implemented as individual panes and bonded to each other by a thermoplastic adhesive layer 4, in this case, for example, a polyvinyl butyral film (PVB), an ethylene vinyl acetate film (EVA), or a polyurethane film (PU). The two individual panes are approx. the same size (the inner pane is somewhat smaller), have a trapezoidal curved contour, and are made, for example, of glass, but can equally also be made of a non-glass material, such as plastic. For an application other than as a windshield, it is also possible to make the two individual panes from a flexible material.

The contour of the outer and inner pane 2, 3 is defined by a common outer edge 5, hereinafter referred to as "edge of the pane". In accordance with the trapezoidal shape, the two individual panes 2, 3 have in each case two opposite long sides, which correspond, in the installation position, to the top and bottom edge of the pane 5a, and two opposite short sides, which correspond, in the installation position, to the left and right edge of the pane 5b.

A transparent heatable coating 6 that serves for electrical heating of the windshield 1 is deposited on the side of the inner pane 3 bonded to the adhesive layer 4. The heatable coating 6 is applied to the inner pane 3 substantially over the entire surface, with a non-coated circumferential edge region 7 on all sides of the inner pane 3 and an outer edge 8 of the heatable coating 6, hereinafter referred to as heating layer edge 8, is set back toward the inside relative to the edge of the pane 5. This measure serves for electrical isolation of the heatable coating 6 toward the outside. In addition, the heatable coating 6 is protected against corrosion penetrating from the edge of the pane 5.

The heatable coating 6 is galvanically divided by a heating-layer-free transverse strip 9. The transverse strip 9 is disposed near the bottom edge of the pane 5a and extends substantially parallel thereto all the way to the heating-layer-free edge region 7 on the left and right edge of the pane 5b. The heatable coating 6 thus comprises a first heatable coating zone 10 (upper, in the installation position) and a second heatable coating zone 11 (lower, in the installation position) that are galvanically separated from each other. The edge region 7 and the transverse strip 9 can in each case be produced by subsequent removal (stripping) of the heatable coating 6 or by masking the inner pane 3 in the region of the edge and transverse strips before deposition of the heatable coating 6.

The windshield 1 is further provided with a heating-layer-free communication window 12 for data transmission, which is known per se to the person skilled in the art. The communication window 12 is extraneous to the understanding of the invention such that it does not have to be dealt with in more detail here.

The transparent heatable coating 6 comprises, in a known manner, a sequence of layers with at least one electrically conductive metallic sublayer, preferably silver (Ag), and, optionally, other sublayers such as antireflection and blocking layers. Advantageously, the sequence of layers has high thermal resistance such that it can survive the high temperatures, typically more than 600° C., necessary for the bending of glass panes without damage, but with the possibility of also providing sequences of layers having low thermal resistance. Instead of being applied directly on the inner pane 3, the heatable coating could, for example, also be applied on a plastic film that is subsequently adhered to the outer and inner pane 2, 3. The heatable coating 6 is, for example, applied by sputtering (magnetron cathode sputtering). The sheet resistance of the heatable coating 6 can, for example, be as much as a few ohms per square, with the sheet resistance typically in the range from 0.5 to 6 ohms/square.

The two heating layer zones 10, 11 are electrically connected to a common first collecting conductor 13 and a common second collecting conductor 14. The first collecting conductor 13 is provided for connection to one pole, for example, the minus pole; the second collecting conductor 14, for connection to the other pole, for example, the plus pole, of a voltage source (not shown). The two collecting conductors 13, 14 can, at least theoretically, be divided into different sections based on their function. Thus, the second collecting conductor 14 has an upper transverse section 15 (referenced in the introduction to the description as "second collecting conductor section") extending along the long upper edge of the pane 5a and the first collecting conductor 13 has a lower transverse section 16 (referenced in the introduction to the description as "first collecting conductor section") extending along the long lower edge of the pane 5a, which have at least an approx. parallel course. The two transverse sections 15, 16 are in each case applied on the upper heatable coating zone 10 and are in direct electrical contact therewith. The upper transverse section 15 abuts the upper edge region 7; the lower transverse section 16 abuts the lower transverse strip 9. A first heating field 17 inside the upper heatable coating zone 10 for heating a visual field of the windshield 1 is enclosed or delimited by the two transverse sections 15, 16. The first heating field 17 covers, in particular, the central visual field of the windshield 1 such that icing can be reliably and safely prevented there.

As can, in particular, be discerned in FIG. 1A, the outer pane 2 is provided with an opaque color layer 18, applied on the side adjacent the adhesive layer 4. The color layer 18 is, for example, made up of a frame-like circumferential dot grid zone 27 configured as a dot grid to which, on the outside, a fully printed full print zone connects. The color layer 18 is preferably made of an electrically nonconductive, black pigmented material that can be baked into the outer pane 2. On the one hand, it prevents seeing an adhesive strand (not shown), with which the windshield 1 is glued into the motor vehicle body; on the other hand, it serves as UV protection for the adhesive material used. The color layer 18 overlays, in particular, the two transverse sections 15, 16 and the communication window 12. The frame-like circumferential dot grid zone 27 bounds the visual field of the windshield 1, with the visual field and the first heating field 15 substantially congruent.

The second collecting conductor 14 further has a left longitudinal section 19 (referenced in the introduction to the description as "fourth collecting conductor section") extending at least approx. perpendicular to the lower transverse section 16, slightly angled in the exemplary embodiment, and a correspondingly disposed right longitudinal section 20 (likewise referenced in the introduction to the description as "fourth collecting conductor section"), which have, at least approx., a parallel course. The two longitudinal sections 19, 20 are in each case applied on the lower heating layer zone 11 and are in direct electrical contact therewith. They extend to the lower transverse section 16 and end roughly flush with the upper or lower edge of the lower heating layer zone 11 such that they have no electrical contact with the lower transverse section 16. The longitudinal sections 19, 20 are offset inward relative to the to short edges 5b of the windshield 1.

The left longitudinal section 19 is electrically connected via a left transition section 21 to the upper transverse section 15 of the second collecting conductor 14. Correspondingly, the right longitudinal section 20 is electrically connected via a right transition section 22 to the upper transverse section 15 of the second collecting conductor 14. The two transition sections 21, 22 run primarily in the edge region 17 such that an electrical short between the two heatable coating zones 10, 11 is prevented.

The first collecting conductor 13 further has a central longitudinal section 23 (referenced in the introduction to the description as "third collecting conductor section"), which extends, starting from the lower transverse section 16, at least approx. perpendicular thereto. The central longitudinal section 23 extends through the transverse strip 9 into the lower heatable coating zone 11, where it ends roughly flush with the lower longitudinal edge of the lower heatable coating zone 11. The central longitudinal section 23 divides the transverse strip 9 into two strip sections 26. The central longitudinal section 23 is situated roughly centered between the left and right longitudinal sections 19, 20 and has, at least approx., a course parallel thereto. It is applied on the lower heatable coating zone 11 and is in direct electrical contact therewith. On the one hand, by the left longitudinal section 19 and the central longitudinal section 23 and, on the other, by the right longitudinal section 20 and the central longitudinal section 23, in each case two second heating fields 24 are enclosed or delimited within the lower heating layer zone 11, in particular to heat an opaque resting and parked position of windshield wipers (not shown) for wiping the visual field of the windshield 1. The 2 second heating fields 24 are galvanically separated from the first heating field 17 by the heating-layer-free transverse strip 9. The three longitudinal sections 19, 20 23 and the two transition sections 21, 22 are overlaid by the opaque color layer 18.

Inside the heatable-coating-free transverse strip 9, a separate heating element 25 (ohmic heating conductor) is in each case disposed on the two sides of the central longitudinal section 23 or in the two strip sections 26. Each of the two heating elements 25 has a meandering curved course and extends starting from the same sided transition section 21, 22 of the second collecting conductor 14 to the central longitudinal section 23, makes a first U-turn, extends to the transition section 21, 22, makes a second U-turn, and extends to the central longitudinal section 23, where it radiates into the lower transverse section 16 of the first collecting conductor 13. The two heating elements 25 are thus, in each case, directly electrically connected both to the first collecting conductor 13 and to the second collecting conductor 14. It would also be equally possible for the two heating elements 25 to have a different course, for example, a zigzag course, with all that matters being that the two heating elements 25 at least approx. completely cover the zone of the two strip sections 26.

The two collecting conductors 13, 14 and the two heating elements 25 are made, for example, in this case of the same material. They can, for example, be produced by printing with a conductive paste, in particular by the screenprinting method, which is baked in, for example, during the bending of the windshield 1. They can, for example, be implemented as strip-shaped or band-shaped electrodes. Alternatively, they can also be made of thin, narrow metal foil strips of copper or aluminum, for instance, that are fixed, in particular, on the adhesive layer 4 and, at the time of bonding of the outer and inner pane 2, 3, applied with electrical contact on the heatable coating 6. Through the action of heat and pressure at the time of bonding of the individual panes, an electrical contact can be ensured.

Through application of a supply voltage on the two collecting conductors 13, 14, the first heating field 17 and the two second heating fields 24 can be heated simultaneously. Also, as a result, the two heating elements 25 are supplied with the supply voltage by means of which the windshield 1 is heated in a zone containing the heating-layer-free transverse strip 9. Because of negligible ohmic resistances compared to the heatable coating 6, the collecting conductors 13, 14 are virtually not heated and make no appreciable contribution to the heating output. In contrast, the electrical resistance of the two heating elements 25 is substantially greater than that of the collecting conductors 13, 14, in order to effect a corresponding heating output. For this purpose, the heating elements 25 can in each case have a width perpendicular to their length measuring in the range from, for example, 0.3 to 2 mm, in particular in the range from 0.5 to 1 mm; whereas the collecting conductors 13, 14, with the same layer thickness and at least approx. comparable length, have a width in the range from, for example, 16 to 20 mm. The lower transverse section 16 of the first collecting conductor 13 delimiting the first heating field 17 is also heated by the two heating elements 25 such that even in a surface area of the windshield 1 containing the lower transverse section 16, icing can be reliably and safely prevented or eliminated. In particular, it is possible to prevent the windshield wiper from having to sweep over an icy surface area of the windshield 1 containing the lower transverse section 16. Advantageously, the two heating elements 25 are designed such that a specific heating output that corresponds at least to the specific heating output of the first heating field 17 can be obtained in the surface area of the windshield 1 containing the lower transverse section 16 by heating the two heating elements 25. For example, the first heating field 17 can be configured such that with impingement by an onboard voltage of 12 to 24 V, a specific heating output of 3 to 4 watts/dm$^2$ is obtained; whereas, in contrast, by means of the two heating elements 25, in each case, a specific heating higher by ca. 30% is obtained in the region of the stripped transverse strip 9. With regard to the prevention of thermal stresses, it can be advantageous for the specific heating output in the stripped transverse strip 9 to be a maximum of 8 watts/dm$^2$. Advantageously, the distance between the two heating elements 25 and the lower transverse section 16 is a maximum of 1 millimeter such that a particularly effective heating of the surface area containing the lower transverse section 16 can be obtained.

Merely for the sake of completeness, it is mentioned that it would also be equally possible to form the heating elements 25 from a different material from that of the collecting conductors 13, 14.

Figure 3:
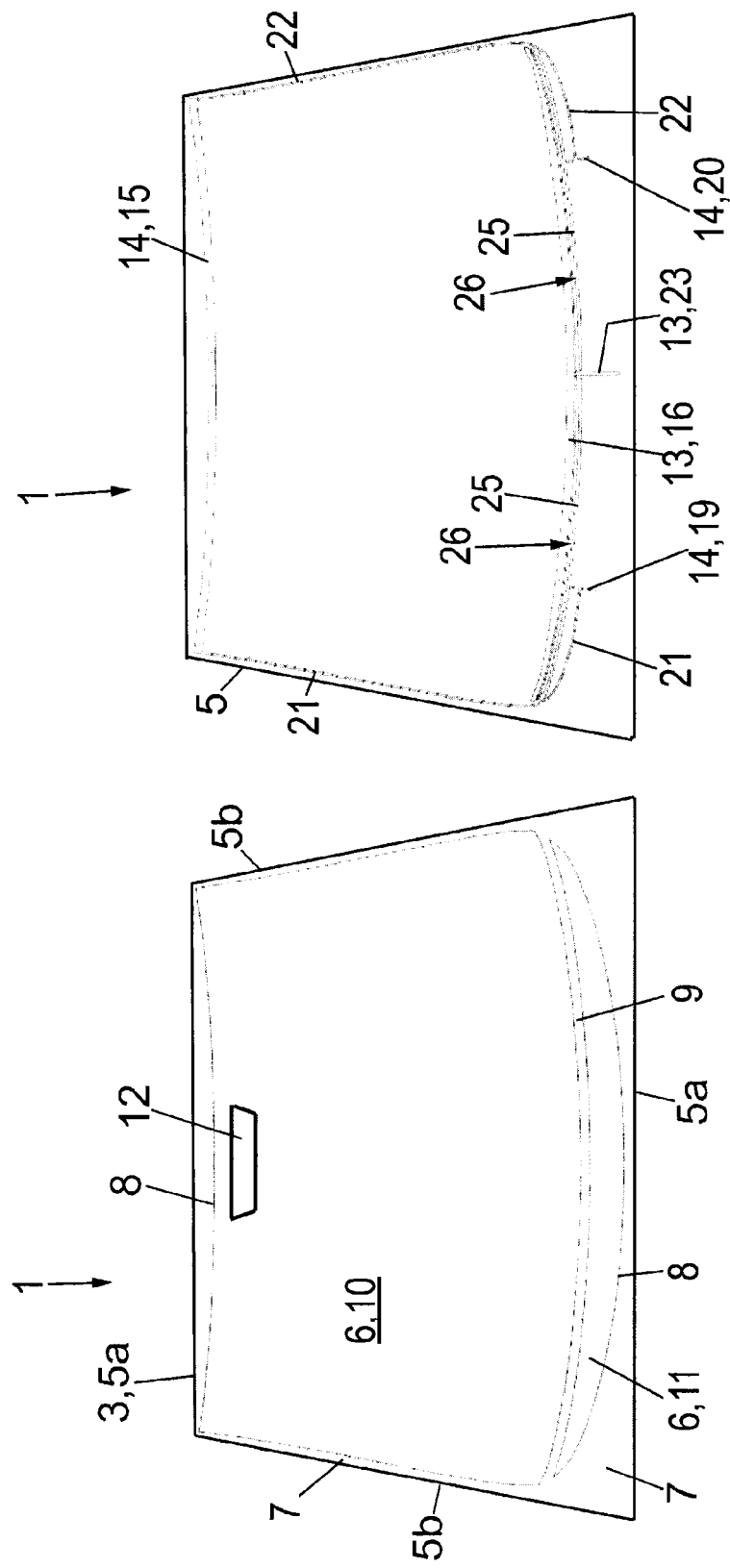
FIG. 3A-3B different perspective views to illustrate an exemplary production method of the windshield of FIG. 1.
Figure 4:
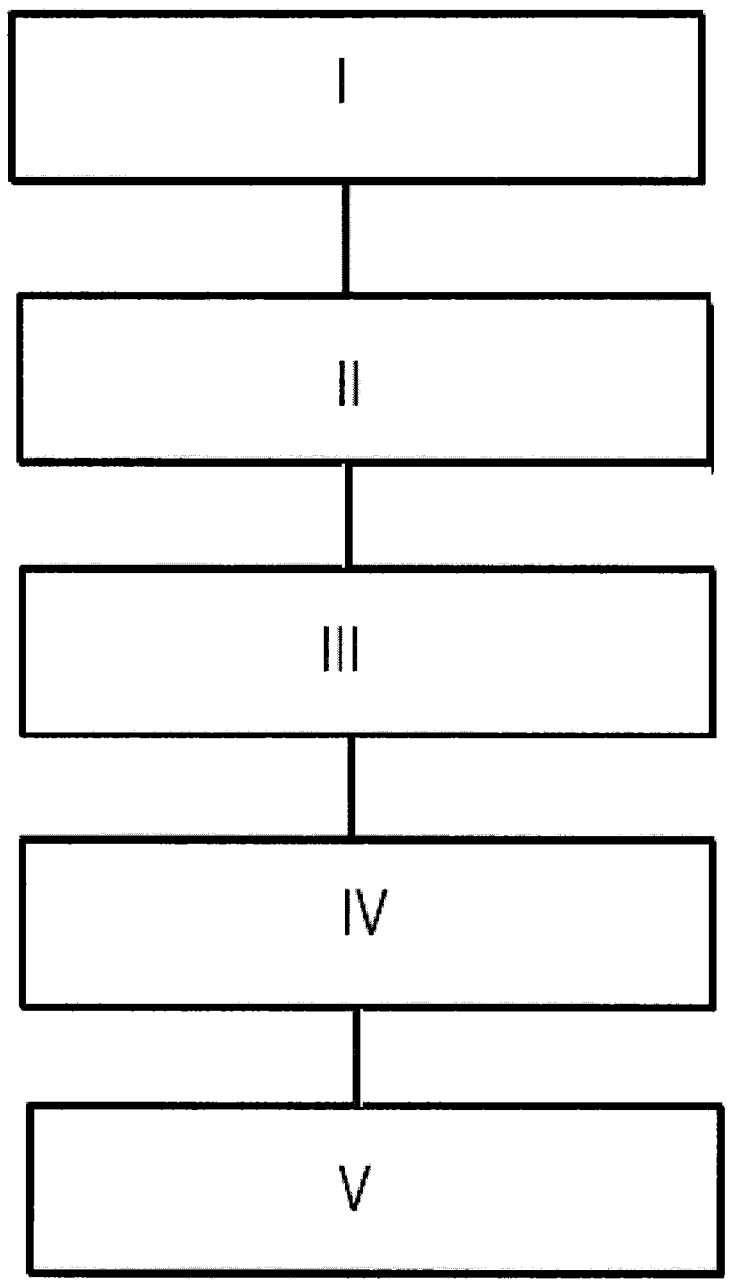
FIG. 4 a flow diagram of the method described in connection with FIG. 3A-3B.

Referring to FIG. 3A-3B and FIG. 4, an exemplary method for producing the windshield 1 is described.

First, the outer and inner pane 2, 3 are cut with the desired trapezoidal contour from a glass blank and, then, the inner pane 2 is coated with the heatable coating 6 by sputtering, with the edge region 7 not coated by means of masking (Step I). Alternatively, it would also be possible for a blank to be coated first, with the inner pane then cut therefrom. The inner pane 2 preprocessed in this manner is then stripped to form the transverse strip 9 and the communication window 12, which can be done in industrial series production using, for example, a mechanically stripping grinding wheel. Alternatively, the edge region 7 can also be produced by stripping (Step II). FIG. 3A depicts the heatable coating-free zones of the inner pane 3. In particular, the heatable coating zones 10, 11 separated by the transverse strip 9 are discernible. The transverse strip 9 can have a width crosswise of its length measuring in the range from 10 to 20 mm, for example.

As depicted in FIG. 3B, the two collecting conductors 13, 14 and the two heating elements 25 are then printed on the inner pane 3, by printing, for example, screen printing with a printing paste, for example, silver printing paste (Step III). By this means, the two transverse sections 15, 16 or bus bars of the first heating field 17 and the three longitudinal sections 19, 20, 23 or bus bars of the two second heating fields 24 are formed. The two heating elements 25 are situated in the heatable coating-free transverse strip 9.

Then, the printing paste is baked in advance, followed by bending of the panes 2, 3 at a high temperature, gluing and soldering the outer connections (not shown), as well as placing the inner and outer pane 3, 2 together and bonding them using the adhesive layer 4 (Step IV).

The invention makes available a transparent pane with electrically heatable coating, wherein the coating is galvanically divided to form at least two heating fields separated from each other by at least one heatable coating-free zone, wherein a surface area of the pane containing the heatable coating-free zone is heatable by at least one heating element. In addition, an adjacent surface area of the pane, which has a heatable coating but contains a collecting conductor not appreciably contributing to the heating output and is not part of a heating field, can also be heated by the heating element. By means of this measure, the deicing properties of the pane, in particular in a surface area of a parked or resting position of windshield wipers of a windshield are significantly improved.

LIST OF REFERENCE CHARACTERS 1 composite pane
2 outer pane
3 Inner pane
4 adhesive layer
5 edge of the pane
5a long edge of the pane
5b short edge of the pane
6 heatable coating
7 edge region
8 heating layer edge
9 transverse strips
10 upper heatable coating zone
11 lower heatable coating zone
12 communication window
13 first collecting conductor
14 second collecting conductor
15 upper transverse section
16 lower transverse section
17 first heating field
18 color layer
19 left longitudinal section
20 right longitudinal section
21 left transition section
22 right transition section
23 central longitudinal section
24 second heating field
25 heating element
26 strip section
27 dot grid zone
28 full print zone

The invention claimed is:

1. A transparent pane, comprising:
an electrically heatable, transparent coating, which extends over a part of a pane surface, wherein the heatable coating is divided by a coating-free zone into a first coating zone and a second coating zone, wherein the first and second coating zones are in each case electrically connected to at least two collecting conductors such that after application of a supply voltage from a voltage source, a current flows over a first heating field formed by the first coating zone and a second heating field formed by the second coating zone,
wherein a heating element is disposed in the coating-free zone that has an ohmic resistance such that application of the supply voltage to the heating element heats the pane in a surface area comprising the coating-free zone,
wherein the heating element is configured such that application of the supply voltage to the heating element heats the pane in a second surface area adjacent to the coating-free zone, which second surface area comprises at least one of the collecting conductors, and
wherein the specific heating output of the at least one heating element is greater than the specific heating output of the heating field to whose coating zone the collecting conductor contained in the surface area is electrically connected.

2. The transparent pane of claim 1, wherein the heating element is electrically connected to the at least two collecting conductors, which are provided for an electrical connection to different poles of the voltage source.

3. The transparent pane of claim 1, wherein a collecting conductor of the first coating zone and a collecting conductor of the second coating zone, which are provided for a connection to one and the same pole of the voltage source, are electrically connected to each other.

4. The transparent pane of claim 3, wherein a first collecting conductor provided for connection to one pole comprises a first collecting conductor section connected to the first coating zone and a second collecting conductor section connected to the second coating zone,
wherein the second collecting conductor section extends from the first collecting conductor section at least at an angle to the first collecting conductor section, and
wherein a second collecting conductor provided for connection to the other pole comprises a third collecting conductor section connected to the first coating zone and a fourth collecting conductor section connected to the second coating zone, which extends to the first collecting conductor section without being electrically connected thereto.

5. The transparent pane of claim 4, wherein the coating-free zone is divided by the second collecting conductor section into two at least approximately same sized zone parts, wherein the second collecting conductor section is disposed between two fourth collecting conductor sections.

6. The transparent pane of claim 5, wherein the heating element is disposed in each zone part.

7. The transparent pane of claim 4, wherein the heating element is configured such that application of the supply voltage heats the surface area of the pane comprising the first collecting conductor section.

8. The transparent pane of claim 1, wherein the heating element is made from one and the same material as the collecting conductor.

9. The transparent pane of claim 1, wherein the heating element is produced from a metallic printing paste.

10. The transparent pane of claim 1, in the form of a composite pane.

11. The transparent pane of claim 1, in the form of a vehicle windshield,
wherein the heating element is disposed in a region of a resting or parked position of a windshield wiper that wipes the pane.

12. A method for producing a transparent pane, the method comprising:
- (I) producing a pane comprising an electrically heatable, transparent coating;
- (II) forming a coating-free zone in the coating, wherein the coating-free zone divides the heatable coating into a first coating zone and a second coating zone;
- (III) producing at least two collecting conductors, which are electrically connected to the first and second coating zones such that after application of a supply voltage, in each case a current flows over a first heating field formed by the first coating zone and a second heating field formed by the second coating zone,
- (IV) producing a heating element in the coating-free zone, which heats a surface area of the pane comprising the coating-free zone, wherein the heating element is configured such that application of the supply voltage to the heating element heats the pane in a second surface area adjacent to the coating-free zone, wherein the second surface area comprises at least one of the collecting conductors, wherein the specific heating output of the at least one heating element is greater than the specific heating output of the heating field to whose coating zone the collecting conductor contained in the surface area is electrically connected.

13. The method of claim 12, wherein the coating-free zone is stripped by mechanical ablation.

14. The method of claim 12, wherein the heating element is made from the same material as the collecting conductors and formed together therewith.

15. The method of claim 14, wherein the heating element and the collecting conductors are produced by printing.

* * * * *